Figure 1:
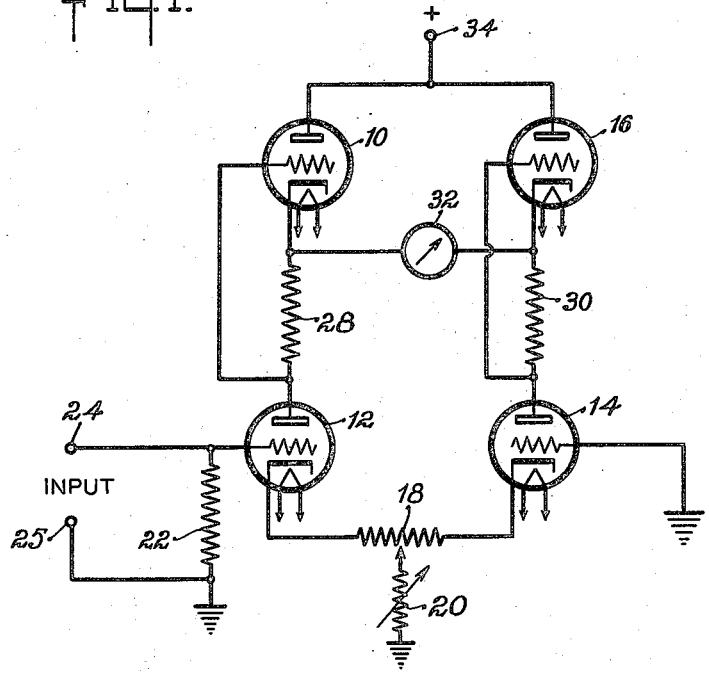

Sept. 7, 1943.　　O. V. MITCHELL ET AL　　2,329,073

THERMIONIC TUBE CIRCUIT

Filed Jan. 1, 1943

INVENTORS
OLIN V. MITCHELL
J. ALBERT HULTQUIST
BY W. S. Grover.
ATTORNEY

Patented Sept. 7, 1943

2,329,073

UNITED STATES PATENT OFFICE 2,329,073

THERMIONIC TUBE CIRCUIT

Olin V. Mitchell and J. Albert Hultquist, Scarsdale, N. Y., assignors to Radio Corporation of America, a corporation of Delaware Application January 1, 1943, Serial No. 471,080

7 Claims. (Cl. 171—95)

The present invention relates to measuring instruments, and more particularly to an improvement in electronic voltmeters.

The use of electronic voltmeters for measuring potentials where no appreciable loading can be tolerated is well known to those skilled in the art. The input impedance of a vacuum tube voltmeter can be made very high with the result that substantially no load is imposed upon the potential source to be measured.

Most vacuum tube voltmeters include some form of a Wheatstone bridge arrangement, and in known vacuum tube voltmeter circuits where a Wheatstone bridge is used, at least two and sometimes three arms of the bridge comprise fixed resistance elements. An electronic path is then included in the other arm of the bridge, or at most in two arms of the bridge. In the operation of a Wheatstone bridge vacuum tube voltmeter circuit, the energizing potential is applied across one of the diagonals, while the meter terminals are connected across the other diagonal. When the bridge is balanced, no difference of potential exists at the meter terminals. If an unknown voltage is then applied to the control electrode of the electron path, the impedance of the path is altered with the result that the normally balanced condition is disturbed, which results in a difference of potential at the meter terminals, and accordingly a deflection of the meter is produced.

In the present invention a Wheatstone bridge arrangement is used in which all four arms of the bridge include electron discharge paths. Two adjacent arms of the bridge are connected as a direct current amplifier, and a similar direct current amplifier circuit is arranged in the other two arms of the bridge. When unknown voltages are applied to the control electrode of one of the electron discharge paths, the bridge circuit is unbalanced and the degree of unbalance is accentuated by reason of the presence of the two direct current amplifier circuits. Such a system results in the provision of a highly sensitive vacuum tube voltmeter circuit by means of which it is possible to produce a meter reading where only a fraction of a volt is applied to the input terminals even when a relatively insensitive milliameter is used as the measuring instrument.

It is, therefore, one purpose of the present invention to provide an electron voltmeter circuit wherein one or more stages of direct current amplification are provided.

Another purpose of the present invention resides in the provision of a circuit for use in connection with an electronic vacuum tube voltmeter which includes a Wheatstone bridge circuit having an electron discharge path in each of the arms of the bridge.

Still another purpose of the present invention resides in the provision of a vacuum tube voltmeter circuit in which the sensitivity of the instrument may be conveniently controlled in order to correctly calibrate the meter.

A further purpose of the present invention resides in the provision of a vacuum tube voltmeter circuit in which the bridge circuit may be readily and conveniently balanced for zero input voltage conditions.

Still another purpose of the present invention resides in the provision of a vacuum tube voltmeter circuit which is relatively insensitive to variations in the applied energizing potentials for the various electron discharge tubes used in the circuit.

Figure 2:
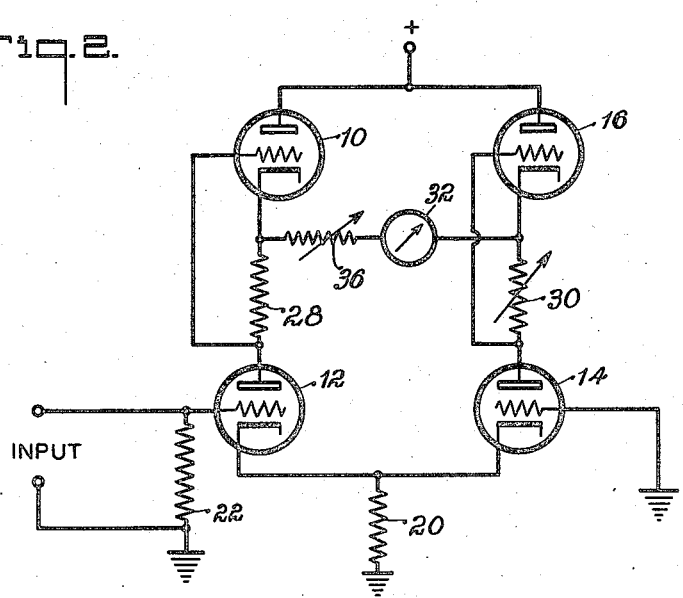

Other purposes and advantages of the present invention will become more apparent to those skilled in the art from the following detailed description, particularly when considered in connection with the drawing, wherein like reference characters represent like parts, and wherein Fig. 1 shows one form of the present invention, and Fig. 2 shows another form of the present invention.

Referring now to the drawing, and particularly to Fig. 1 thereof, there is shown a Wheatstone bridge including four electron discharge paths 10, 12, 14 and 16. Each of these electron paths includes at least a cathode, a control electrode and an anode. The cathodes of tubes or electron paths 12 and 14 are connected together by means of a relatively low resistance 18, and it is preferable that this resistance be in the form of a potentiometer. The movable contact associated with the resistance 18 is then connected to ground or a point of fixed potential by means of a resistance 20, preferably made adjustable. Resistance 20 is thus a common cathode return circuit for tubes 12 and 14. The control electrode of tube 12, which is the input electrode of the vacuum tube voltmeter circuit, is connected to ground by means of a high resistance 22, and input terminals 24 and 26 are provided, the former being connected to the control electrode of tube 12 and the latter being connected to ground. The anode of tube 12 is connected to the cathode of tube 10 by means of cathode resistance 28, and the control electrode of tube 10 is connected directly to the anode of tube 12.

The control electrode of tube 14 may be connected directly to ground or a point of fixed potential, but if desired a resistance (comparable to the input resistance 22) may be included in this connection. The anode of tube 14 is connected to the cathode of tube 16 by way of cathode resistance 30 and the control electrode of tube 16 is then directly connected to the anode of tube 14. The anodes of each of the tubes 10 and 16 are connected to a terminal 34 to which is applied a positive potential from a voltage source (not shown). The negative terminal of the voltage source may be connected to ground or to the point of fixed potential. The measuring instrument or meter 32 for indicating a balanced or unbalanced condition of the bridge is connected between the cathodes of tubes 10 and 16.

It is preferable that all of the tubes 10, 12, 14 and 16 be of a similar type, and have similar characteristics. With the control electrode of tube 12 at ground potential, the bridge including the four electron discharge paths may be so balanced that zero differential potential will exist between the cathodes of tubes 10 and 16. If, due to slight discrepancies in the characteristics of the tubes, an unbalanced condition does exist, the bridge may be readily brought into balance by an adjustment of the movable contact along the relatively low resistance 18, which is connected between the cathodes of tubes 12 and 14. By an adjustment of this movable contact, exact balance may be accomplished, and the meter 32 may be caused to read zero.

In the operation of the above described electronic vacuum tube voltmeter circuit, when a negative potential is applied to the control electrode of tube 12, the bias on tube 12 will be increased with the result that the impedance of the tube is increased and the amount of current permitted to pass through tube 12 will decrease. This decrease in current causes a decrease in the amount of current through the anode-cathode resistance 28 with the result that the potential drop across resistance 28 will be reduced, which decreases the grid bias on tube 10. This decrease in the bias of tube 10 causes the impedance of tube 10 to decrease which results in an increase in the current permitted to pass through this tube. It must be assumed, of course, that the meter 32 is included in the circuit to provide a conducting path for the differential current. As stated above, the application of a negative potential to the control electrode of tube 12 causes a decrease in the amount of current passed by tube 12, with the result that the potential drop across the common cathode resistance 20 is decreased which causes a reduction in the bias applied between the control electrode and cathode of tube 14. Accordingly, the impedance of tube 14 is decreased and the amount of electron current permitted to pass through tube 14 increases, which causes a rise in the voltage drop present across the anode-cathode resistance 30 which is connected in the anode circuit of tube 14. This increase in potential drop across resistance 30 then increases the bias on tube 16, with the result that the impedance of tube 16 is increased and accordingly the electron current through tube 16 decreases.

It will be seen, therefore, that the application of a negative potential to the control electrode of tube 12 causes an increase in the impedance of tubes 12 and 16, and a corresponding decrease in the impedance of tubes 10 and 14. This causes an unbalanced condition of the bridge with the result that a differential potential will be present between the cathodes of tubes 10 and 16. The potential of the cathode of tube 10 will change in a positive direction while the potential of the cathode of tube 16 will change in a negative direction. Thus the meter 32, connected between the two cathodes of tubes 10 and 16, will produce a reading proportional to the differential potential.

In order to cause the meter 32 to deflect at full scale for a predetermined voltage applied to the control electrode of tube 12, the sensitivity of the vacuum tube voltmeter circuit may be altered by varying the resistance of the common cathode resistance 20. By an adjustment of this resistance, the meter (which may be a conventional low resistance one milliampere meter) may be caused to be deflected at full scale on application of a negative potential of some desired intensity, as, for example, 0.5 volt.

The circuit above described and shown in Figure 1 is exceedingly sensitive, and this sensitivity is the result of the inclusion of the direct current amplifying action of tubes 10—12 and of tubes 14—16. Furthermore, such an arrangement provides a circuit in which substantially no load is imposed upon the voltage source by reason of the fact that the input resistance 22 may be made very high, for example, of the order of 20 megohms. It is not necessary to use a highly sensitive meter in the bridge circuit, although if a more sensitive meter is used, the sensitivity of the circuit is commensurately improved. Because of the fact that electron discharge paths are provided in each arm of the bridge, the bridge is substantially insensitive to changes in the voltage applied to the terminal 34 and also relatively insensitive to variations in the voltage applied to the heater elements of the various electron tubes.

A second form of the present invention is also shown in Figure 2, which is in many respects similar to the arrangement shown in Figure 1 except that different provisions are made for altering the sensitivity of the instrument and for adjusting the circuit for a balanced condition. As explained in Figure 1, a potentiometer resistance 18, which is connected between the cathodes of tubes 12 and 14, may be used for balancing the bridge circuit, however, the inclusion of this resistance at this point may have a very slight effect on the sensitivity of the circuit when a zero balance adjustment is made. In order to prevent any possible change in the sensitivity of the instrument when adjusting for a balanced condition, the potentiometer 18 may be omitted and a balanced condition of the bridge may be brought about by making resistance 30 adjustable as indicated in Figure 2. Naturally, a balanced condition could as well be produced by making resistance 28 adjustable.

As a further form of the invention, the sensitivity of the vacuum tube voltmeter circuit may be altered by placing a resistance 36 (see Figure 2) in series with the meter 32, since an adjustment of the resistance contained in the meter circuit will also affect the sensitivity of the circuit, and if such a resistance is provided, the common cathode resistance 20 may be in the form of a fixed resistance. The operation of the bridge circuit shown in Figure 2 is identical to the operation of the circuit shown in Figure 1, and described above.

The type of tube used in the present invention is more or less immaterial, although it is preferable that a tube having a low plate resistance be used. If single triodes are used, a tube such as, for example, type 6J5 may be employed, or if dual tubes are used, a tube such as type 6SN7GT, 6F8G, or 7N7 may be employed. It is not necessary to specifically match the tubes used in the circuit since slight mismatching may be compensated for by the zero balancing means.

It has been found that, if the values of the resistances 28 and 30, as well as the common cathode resistance 20 are properly chosen so that the tubes operate at about the middle of their grid voltage-plate current characteristic, the response of the vacuum tube voltmeter circuit will be perfectly linear and either positive or negative potentials may be applied to the control electrode of tube 12, provided, of course, that the amplitude of the applied potentials does not exceed cut-off or saturation values. Naturally if the polarity of the applied voltage is changed, the connections to the meter 32 must also be changed or reversed. The inclusion of a simple polarity reversing switch in the meter circuit will permit the application of voltages of either polarity to the input terminal 24 of the vacuum tube voltmeter circuit while still permitting the use of a meter having its zero mark at one end of the scale. Thus the full scale of the meter is available for either positive or negative potentials applied to the input terminal 24.

It may be seen, therefore, that an improved and highly sensitive though stable vacuum tube voltmeter circuit has been provided which is simple in construction and which embodies a minimum of circuit elements. Furthermore, the vacuum tube voltmeter circuit shown and described herein has the advantage that destructive overloads cannot be applied to the meter 32 since the maximum amount of current to which the meter is subjected is limited by the amount of current which is permitted to pass through the electron discharge tubes.

Naturally, the voltage range of the vacuum tube voltmeter circuit can be extended through the use of a potential divider, as is well known to those skilled in the art. If a potential divider is used, then the resistance 22 is normally not employed since it is replaced by all or a portion of the input potential divider. When a potential divider is used, a balanced condition of the bridge in the present invention is maintained irrespective of the position of the tap switch on the voltage divider, since a zero balance condition is not disturbed by variation in the amount of resistance included in the grid circuit of tube 12.

Furthermore, as will be appreciated by those skilled in the art, the vacuum tube voltmeter shown and described herein may be used for measuring alternating current potentials when an appropriate rectifier is provided between the source of potential and the input of the vacuum tube voltmeter. It is also possible to use the circuit of the present invention for measuring resistance values through the use of an external source of potential of low value in a manner well known to those skilled in the art.

Although the present invention has been shown and described in considerable detail, it is to be understood that various alterations and modifications may be made therein without departing from the spirit and scope thereof, and it is desired that any and all such alterations and modifications be considered within the purview of the present invention, except as limited by the hereinafter appended claims.

Having now described our invention, what we claim as new and desire to have protected by Letters Patent, is:

1. A bridge circuit including a variable impedance in each arm thereof, an input circuit, means for varying the impedance in one of said arms in one direction in accordance with potentials applied to said input circuit, and means responsive to the change in impedance in said one arm for varying the impedance in both adjacent arms in the opposite direction and the impedance in the opposite arm in the same direction.

2. A bridge circuit including a variable impedance in each arm thereof, an input circuit, means for varying the impedance of one of said arms in one direction in accordance with potentials applied to said input circuit, means responsive to the change in impedance of said one arm for varying the impedance of both adjacent arms in the opposite direction, and means responsive to the variation of impedance of one of said adjacent arms for varying the impedance of the remaining arm in the same direction as in said first mentioned arm.

3. A bridge circuit including an electron discharge path in each arm thereof, a control electrode in each of said discharge paths, an input circuit, means for coupling one of said control electrodes to said input circuit to vary the impedance of the associated path in accordance with potentials impressed on said input circuit, the control electrodes in the adjacent paths being so connected as to vary the impedance of the said adjacent paths in the opposite direction to the impedance variation of said first named path, and the control electrode in the remaining one of said paths being so connected as to vary the impedance of the associated path in the same direction as in said first mentioned path.

4. A bridge circuit including an electron discharge tube in each arm thereof, each tube including an anode, cathode and control electrode, means for connecting a source of anode potential across one diagonal of said bridge, said means including a series resistor connected to the cathodes of a pair of adjacent tubes, an input circuit having one terminal connected to the control electrode of one of said adjacent tubes, another terminal of said input circuit being connected to the end of said series resistor remote from said cathodes, means for connecting the control electrode of the other of said adjacent tubes to said another terminal, series resistors connected from the anodes of each of said adjacent tubes to a cathode of one of the remaining ones of said tubes, connections from the control electrodes of each of said remaining tubes to an anode of each of said adjacent tubes, the cathodes of said remaining ones of said tubes constituting terminals of the other diagonal of said bridge.

5. A bridge circuit including a variable impedance in each of the four arms of the bridge, an input circuit connected to the variable impedance in one arm of the bridge to cause the impedance of that arm to increase in response to the application of a potential of a predetermined polarity to the input circuit, means associated with the variable impedance in said one arm to cause both of the variable impedances in the two adjacent arms to decrease in response to the increase in the impedance in said one arm, and means associated with the variable impedance in one of said adjacent arms to cause the variable impedance in the remaining arm to increase in response to the decrease in the impedance of said one adjacent arm.

6. A bridge circuit including a variable impedance in each of the four arms of the bridge, an input circuit connected to the variable impedance in one arm of the bridge to cause the impedance of that arm to vary in a predetermined direction in response to the application of a potential of a predetermined polarity to the input circuit, means associated with the variable impedance in said one arm to cause both of the variable impedances in the two adjacent arms to vary in a direction opposite to and in response to the variation in the impedance in said one arm, and means associated with the variable impedance in one of said adjacent arms to cause the variable impedance in the fourth arm to vary in a direction corresponding to the variation in the impedance in the said one arm in response to the variation in the impedance of said one adjacent arm.

7. A bridge circuit including an electron discharge tube in each of the four arms of the bridge, an input circuit connected to the electron discharge tube in one arm of the bridge to cause the impedance of that arm to increase in response to the application of a negative potential to the input circuit, means associated with the electron discharge tube in said one arm to cause the impedance of both of the electron discharge tubes in the two adjacent arms to decrease in response to the increase in the impedance of the electron discharge tube in said one arm, means associated with the electron discharge tube in one of said adjacent arms to cause the impedance of the electron discharge tube in the fourth arm to increase in response to the decrease in the impedance of the electron discharge tube in said one adjacent arm, means for applying energizing potentials across one diagonal of the bridge circuit and means for connecting an indicating device across the other diagonal of the bridge circuit.

OLIN V. MITCHELL.
J. ALBERT HULTQUIST.